United States Patent
Noguchi et al.

(10) Patent No.: US 7,268,914 B2
(45) Date of Patent: Sep. 11, 2007

(54) IMAGE PROCESSING APPARATUS, IMAGE FORMING APPARATUS, IMAGE PROCESSING METHOD, AND PROGRAM PRODUCT THEREOF

(75) Inventors: Kazuyoshi Noguchi, Toyokawa (JP); Yoshihiko Hirota, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 934 days.

(21) Appl. No.: 10/154,850

(22) Filed: May 28, 2002

(65) Prior Publication Data

US 2002/0176104 A1 Nov. 28, 2002

(30) Foreign Application Priority Data

May 28, 2001 (JP) ............................... 2001-158972

(51) Int. Cl.
*G06F 15/00* (2006.01)
*B41B 1/00* (2006.01)
*G03F 3/08* (2006.01)
*G06K 15/00* (2006.01)
*G09G 5/00* (2006.01)

(52) U.S. Cl. ..................... 358/1.9; 358/1.1; 358/523; 358/2.1; 345/581

(58) Field of Classification Search ............... 358/1.9, 358/1.16, 404, 444, 430, 432, 433, 1.1, 2.1, 358/523; 382/171, 173; 347/10, 19, 106; 345/581
See application file for complete search history.

(56) References Cited

U.S. PATENT DOCUMENTS 5,613,015 A * 3/1997 Suzuki et al. ............... 382/173
5,642,208 A 6/1997 Takahashi et al.
5,937,152 A * 8/1999 Oda et al. .................. 358/1.16
2002/0180815 A1* 12/2002 Nou ........................... 347/10

FOREIGN PATENT DOCUMENTS

| EP | 1 085 747 A1 | 3/2001 |
| JP | 10-098595 | 4/1998 |
| JP | 11-179975 | 7/1999 |
| JP | 2000-078408 | 3/2000 |
| JP | 2000-261676 | 9/2000 |
| JP | 2000-263856 | 9/2000 |

OTHER PUBLICATIONS

Japanese Office Action mailed Jan. 24, 2006, directed to JP Application No. 2001-158972.

* cited by examiner

*Primary Examiner*—Kimberly Williams
*Assistant Examiner*—Charlotte M. Baker
(74) *Attorney, Agent, or Firm*—Morrison & Foerster LLP

(57) ABSTRACT

It is objected to provide an image processing apparatus achieving decrease of memory volume to be used, simplified print process, and enhancement of productivity. Firstly, a plurality of image data are recorded in memories provided for respective colors. Based on the image data or mode selection by a user, it is determined that whether a multi-color image or a monochrome image is to be outputted. Next, memories 302 of respective colors transmit image data of respective colors to a computing unit 304 in accordance with readout-timing signals from a timing selector 305. In case a multi-color image is to be outputted, the timing selector 305 transmits readout-timing signals of respective colors taking time difference length of which is predetermined for each color. In case a monochrome image is to be outputted, the timing selector 305 transmits readout-timing signals of respective color simultaneously. A computing unit 304 forms monochrome image data in accordance with image data of respective colors, whereby process of monochrome print is simplified.

15 Claims, 10 Drawing Sheets

ORIGINAL DOCUMENT

WITHOUT REGION DISCRIMINATION

WITH REGION DISCRIMINATION

FIG. 14
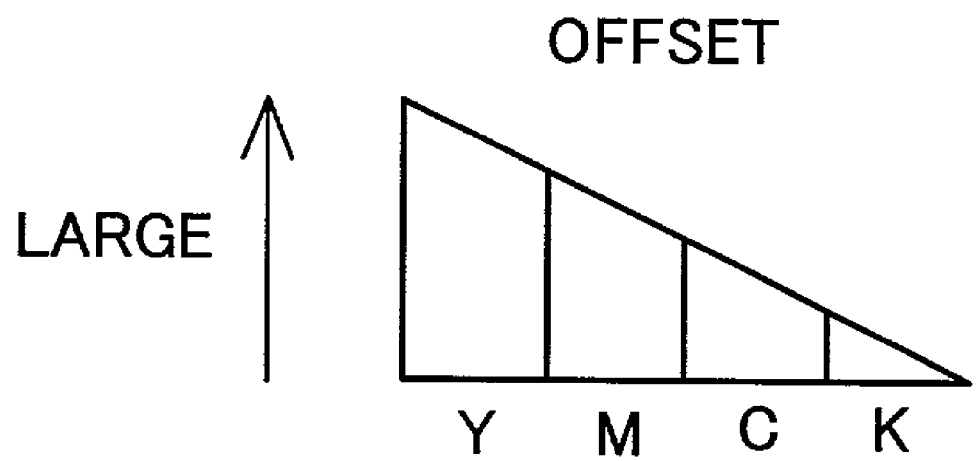
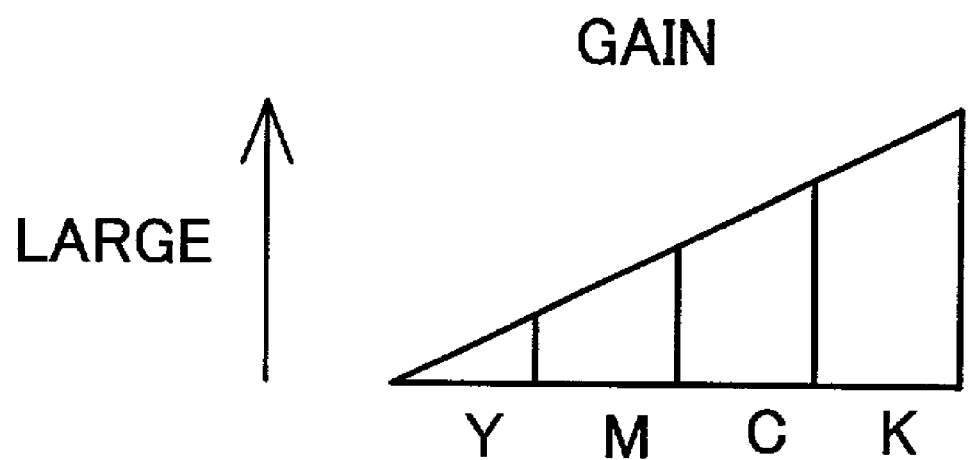

IMAGE PROCESSING APPARATUS, IMAGE FORMING APPARATUS, IMAGE PROCESSING METHOD, AND PROGRAM PRODUCT THEREOF

This application is based on Application No. 2001-158972 filed in Japan, contents of which is hereby incorporated by reference.

BACKGROUND OF THE INVENTION

1. Field of the Invention

The present invention relates to an image processing apparatus, an image forming apparatus, an image processing method, and a program product thereof. More particularly, the present invention relates to an image processing apparatus and the like capable of conducting monochrome print based on a set of color image data.

2. Description of Related Art

A conventional tandem type color image processing apparatus includes full-color dedicated memories for full-color print and a monochrome dedicated memory for monochrome print. These memories are arranged as areas to store image data read (read operation will be referred as "scan" hereinafter). In case an image is formed with full-color mode, data of Yellow (Y, hereinafter), Magenta (M, hereinafter), Cyan (C, hereinafter), and Black (K, hereinafter) obtained by full-color scanning are stored in the full-color dedicated memories. From the memories, image data of respective colors are read out one by one, and a resultant color image is printed out. The image data of these colors are read out with respective readout timing, in other words, respective delay time. Readout timing of respective colors are determined by positioning of image formation units arranged for respective color. On the other hand, in case an image is formed with monochrome mode, image data obtained by monochrome scanning is stored in the monochrome dedicated memory. The monochrome image data is read out from the memory and printed out by a K(Black)-image forming section.

There has been utilized an image processing apparatus such that fresh image data obtained by scanning, is temporarily stored in a memory 101 such as shown in FIG. 1, as to discriminate an attribute of a document. After attribute of the document is discriminated, image data of Y, M, C, K or monochrome (K) image data are/is formed and the formed image data is stored in YMCK memories 102 or a K dedicated memory 103. After that, image data of each color is read out and, a resultant image is printed. The image processing apparatus such as above has a merit to omit pre-scan for automatic color selection (indicated as ACS herein after), whereby data obtained by a first-time scan is directly delivered and stored in the YMCK memories 102 or the K dedicated memory 103.

However, the above-mentioned prior art has had a problem. Specifically, as shown in FIG. 1, the conventional image processing apparatus needs the memory 101 to store fresh data obtained by scan. A structure such as shown in FIG. 2 is conceivable, i.e., arranging the YMCK memories 102 and the K dedicated memory 103 without the memory 101 so as to conduct ACS based on fresh data inputted in the YMCK memories 102. However, in this manner, in case a document is monochrome, it is after conversion processing at the YMCK memories 102 is finished that image data of K is written in the K dedicated memory 103. Accordingly, this manner of processing must take the following five steps to obtain a monochrome image: (1) write the fresh data in the YMCK memories 102; (2) apply ACS processing to the fresh data stored in the memories 102; (3) form monochrome data; (4) write the monochrome data in the K dedicated memory 103 and (5) read out the monochrome data from the K dedicated memory 103. This manner makes print process complicated and obstructs enhancement of productivity.

SUMMARY OF THE INVENTION

The present invention has been made in order to solve the foregoing problem. It is an object of the present invention to provide an image forming apparatus or the like achieving decrease of memory volume to be used, simplified print process, and enhancement of productivity.

According to one aspect of the present invention, there is provided an image processing apparatus comprising: a plurality of memories for storing image data of respective colors; color determining means for determining image data stored in the memories should be outputted with multi-color mode or monochrome mode; readout signal generating means for generating a plurality of readout signals of respective colors taking predetermined length of time difference which differs among the respective colors in case a multi-color image is to be outputted, and generating a plurality of readout signals of respective colors simultaneously in case a monochrome image is to be outputted; readout means for reading out image data of respective colors from the memories in accordance with readout signals from the readout signal generating means; and monochrome-image-data forming means for forming monochrome image data in accordance with image data of respective colors read out by the readout means in case a monochrome image is to be outputted.

In this image processing apparatus, the color determining means determines which type of image, a multi-color image or a monochrome image, is to be outputted. In general, a determination is made automatically based on contents of image data. However, an operator may select multi-color/monochrome by manual operation. After a multi-color/monochrome determination is made, the readout signal generating means generates a plurality of readout signals of respective colors. In case a multi-color image is to be outputted, a plurality of readout signals of respective colors are outputted taking predetermined length of time difference between successive signals. Predetermined length of time mentioned here corresponds to delay time in proportion to distance between adjacent image forming units of respective colors. On the other hand, in case a monochrome image is to be outputted, a plurality of readout signals for reading out image data of respective colors are generated simultaneously. Then the readout means reads out data stored in the memories for respective color image data in accordance with readout signals generated by the readout signal generating means. That is, in case a multi-color image is to be outputted, image data of respective colors are successively readout taking predetermined length of time difference between successive readout operations. On the other hand, a monochrome image is to be outputted, image data of respective colors are readout simultaneously. In case of a monochrome image, the monochrome-image-data forming means further on forms resultant monochrome image data based on the image data of respective colors read out by the readout means. Thereby, process of monochrome image print is simplified and productivity can be enhanced.

According to another aspect of the present invention, there is provided an image forming apparatus for forming an image based on image data, the image data forming apparatus comprising: a plurality of image forming sections for forming images in different colors on image carriers arranged for each of the image forming sections; a plurality of memories for storing image data of respective colors, the memories being arranged for each of the image forming sections; multi-color/monochrome determining means for determining that an image formation based on image data stored in the memories should be executed in multi-color mode or a monochrome mode; readout signal generating means for generating a plurality of readout signals for the respective memories with different timing in case a multi-color image is to be formed, and generating a plurality of readout signals for the respective memories simultaneously in case a monochrome image is to be formed; readout means for reading out image data of respective colors from the memories in accordance with readout signals from the readout signal generating means; first control means for controlling to operate the plurality of the image forming sections in accordance with image data read out by the readout means and form a multi-color image; monochrome-image-data forming means for forming monochrome image data in accordance with image data of respective colors read out by the readout means; and second control means for controlling to operate one of the plurality of the image forming sections in accordance with monochrome image data formed by the monochrome-image-data forming means and form a monochrome image.

In the inventive image forming apparatus, the first control means controls the image forming sections to operate in accordance with image data of respective color read out with different timing in case a multi-color image is to be formed, whereby a multi-color image is formed. In case a monochrome image is to be formed, the second control means controls one of the image forming sections to operate in accordance with monochrome image data formed by the monochrome image data forming means, whereby a monochrome image is formed.

According to a third aspect of the present invention, there is provided an image processing method for handling image data, the image processing method comprising steps of: determining that an image based on image data is to be outputted in multi-color or monochrome; reading out a plurality of image data of respective colors with timing which differs by respective colors in case a multi-color image is to be outputted, and reading out a plurality of image data of respective colors simultaneously in case a monochrome image is to be outputted; and forming monochrome image data in accordance with image data of respective colors read out at the precedent step in case a monochrome image is to be outputted.

According to a fourth aspect of the present invention, there is provided an image forming method for forming image based on image data, the image forming method comprising steps of: determining that an image based on image data is to be formed in multi-color or monochrome; reading out a plurality of image data of respective colors with timing of which differs by respective colors in case a multi-color image is to be formed, and reading out a plurality of image data of respective colors simultaneously in case a monochrome image is to be formed; forming monochrome image data in accordance with image data read out at precedent step in case a monochrome image is to be formed; and forming a multi-color image by controlling a plurality of image forming sections to operate in accordance with the plurality of the image data of respective colors read out at precedent step in case a multi-color image is to be formed, and forming a monochrome image by controlling one of the plurality of the image forming sections to operate in accordance with the plurality of the image data of respective colors read out at precedent step in case a monochrome image is to be formed.

Still further, as still another aspect of the present invention, there are provided a program product and a computer readable medium storing a computer program for executing image data processing by a image processing apparatus, wherein the computer program comprises steps of: determining that an image based on image data is to be outputted in multi-color or monochrome; reading out a plurality of image data of respective colors with timing which differs by colors in case a multi-color image is to be formed in accordance with the precedent determining step, and reading out a plurality of image data of respective colors simultaneously in case a monochrome image is to be formed in accordance with the precedent determining step; and forming monochrome image data in accordance with image data of respective color read out at the precedent reading out step in case a monochrome image is to be outputted. Thereby, effects described in the above can be brought to existent image processing apparatuses.

In case monochrome image data is to be formed, it is preferable that different operational parameters are selectively used depending on that a target region in image data is a character region or a photographic region. If same operational parameter is used regardless of types of regions, a character region in image data is reproduced lightly. Therefore, an operational parameter for character region is set higher than that for photographic region so that a character image can be reproduced clearly.

Furthermore, in case monochrome image data is to be formed, it is preferable to selectively use different operational parameters which differ by respective colors included in target image data. That is, if same operational parameter is applied to any colors when monochrome image data corresponding to an original color image is to be formed, lightness of light yellow (Y) in the original image and that of dark cyan (C) in the original image are outputted with same level of lightness. Accordingly, operational parameters which differ by respective colors should be used so as to reproduce a monochrome image lightness of which approximates to that of the original image.

As apparent from the above description, the present invention provides an image forming apparatus or the like achieving decrease of memory volume to be used, simplified print process, and enhancement of productivity.

BRIEF DESCRIPTION OF DRAWINGS

For a better understanding of the present invention, reference is made to the following detailed description of the invention, just in conjunction with the accompanying drawings in which:

FIG. 14 shows graphs showing offset values and gain values to be applied to respective color data.

DETAILED DESCRIPTION OF PREFERRED EMBODIMENTS

Figure 1:
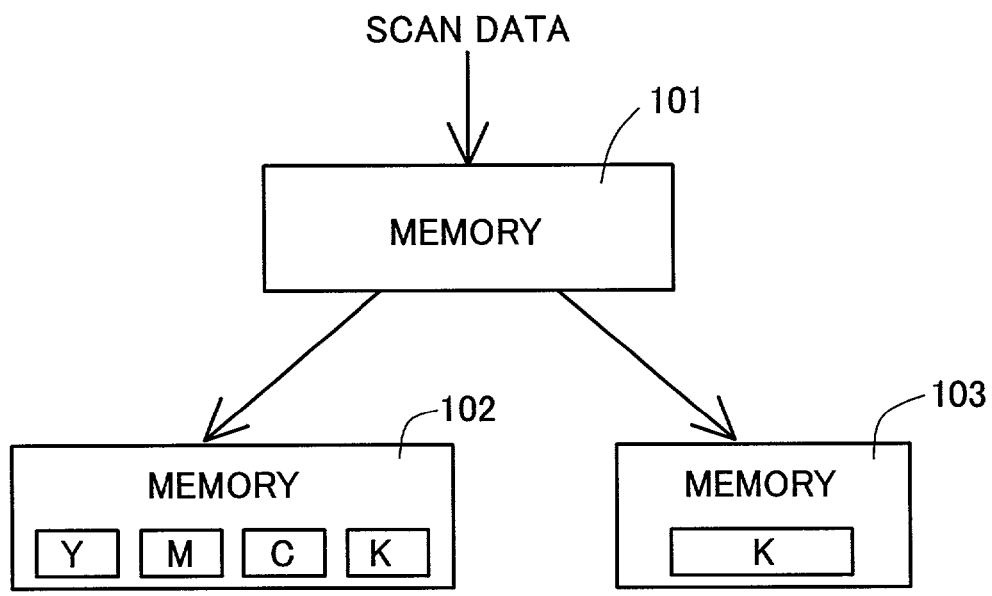
FIG. 1 shows a memory structure of prior art.
Figure 2:
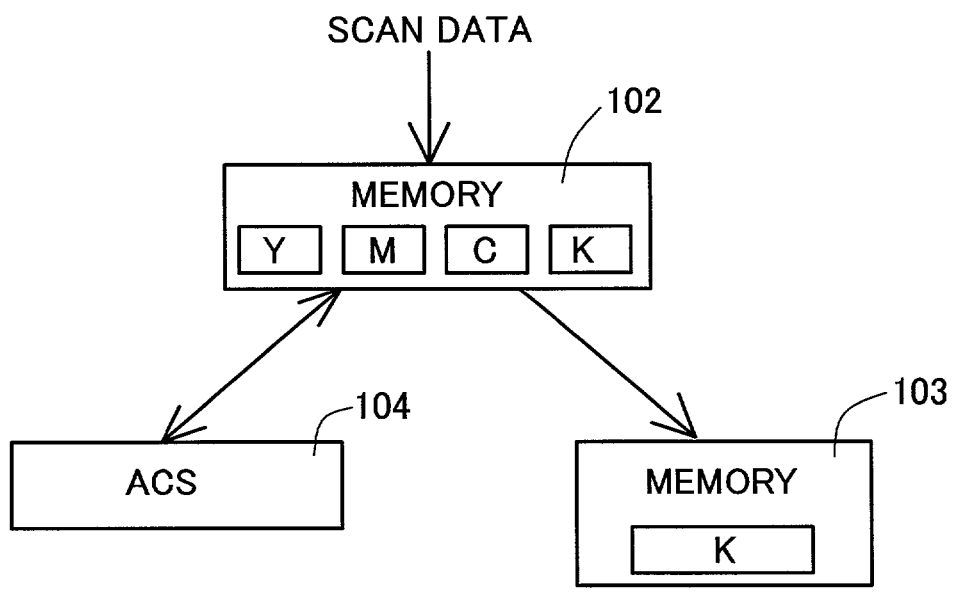
FIG. 2 shows a memory structure of another prior art.
Figure 3:
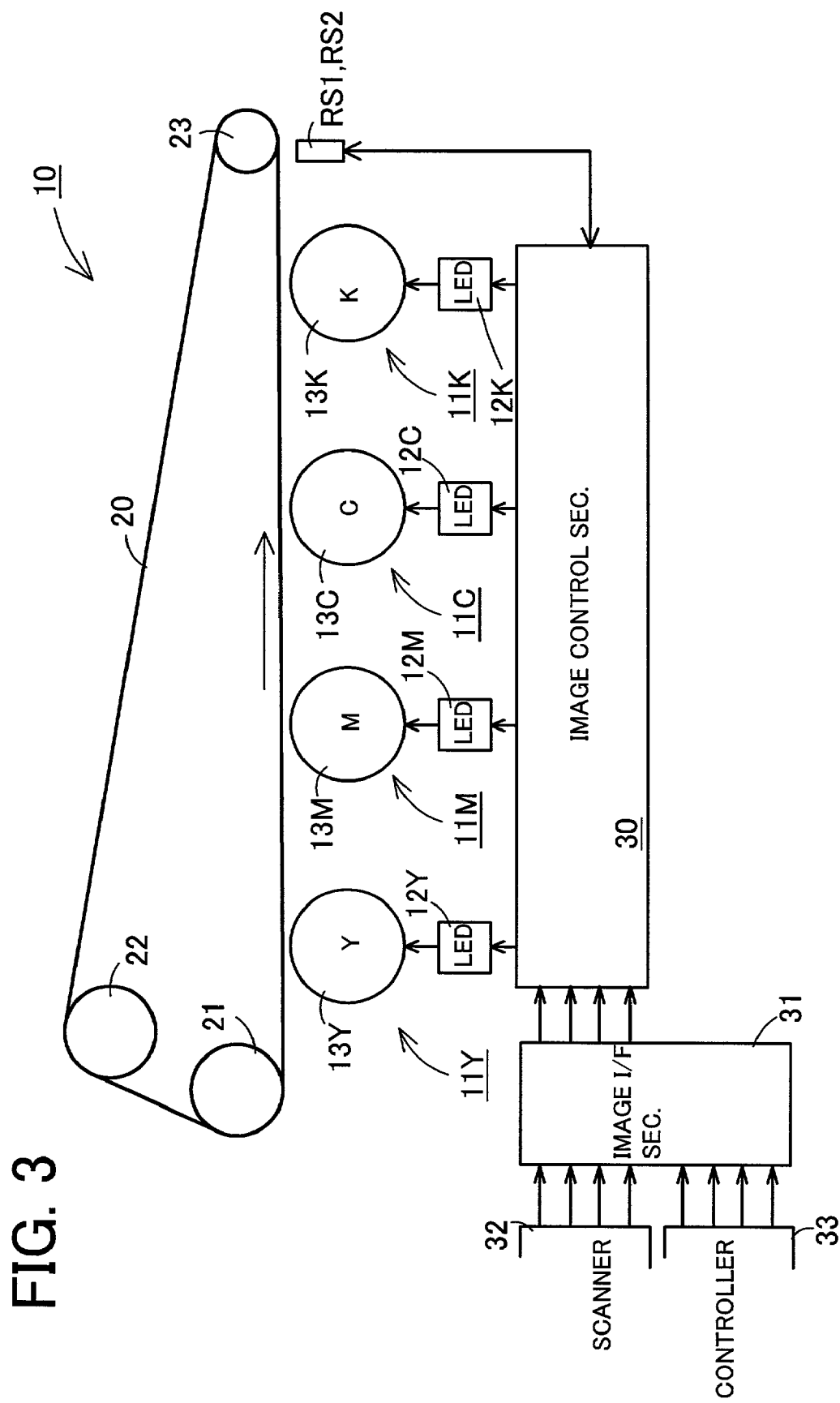
FIG. 3 shows a schematic construction of an image forming apparatus directed to an embodiment.

Hereinafter, the best mode embodying an image processing apparatus according to the present invention will be described in detail by referring to drawings. Here will be described a printer as an embodiment of the present invention. As shown in FIG. 3, an image forming apparatus 10 directed to the present embodiment includes image forming sections 11Y, 11M, 11C, 11K, a transfer belt 20, and an image control section 30.

The image forming sections 11Y, 11M, 11C, and 11K form images (including test pattern images) on a transfer belt 20. The image forming sections 11Y, 11M, 11C, and 11K include respective LED arrays 12Y, 12M, 12C, and 12K, and respective photosensitive drums 13Y, 13M, 13C, and 13K. In each of the image forming sections 11Y, 11M, 11C, and 11K, the LED arrays 12Y, 12M, 12C, and 12K form latent images on the photosensitive drums 13Y, 13M, 13C, and 13K, respectively. The latent images get developed to toner images and transferred onto a transfer belt 20 or onto paper on the transfer belt 20. The toner images in different colors are transferred and superimposed successively the transfer belt 20 by each of the image forming sections 11Y, 11M, 11C, and 11K, whereby a multi-color image is formed.

The image control section 30 supplies image signals for forming an image to each of the image forming sections 11Y, 11M, 11C, and 11K and controls operation of the image forming sections 11Y, 11M, 11C, and 11K. Therefore, the image control section 30 is connected to both a scanner 32 and a controller 33 through an image interface section 31 so as to obtain image signals and the like.

Figure 4:
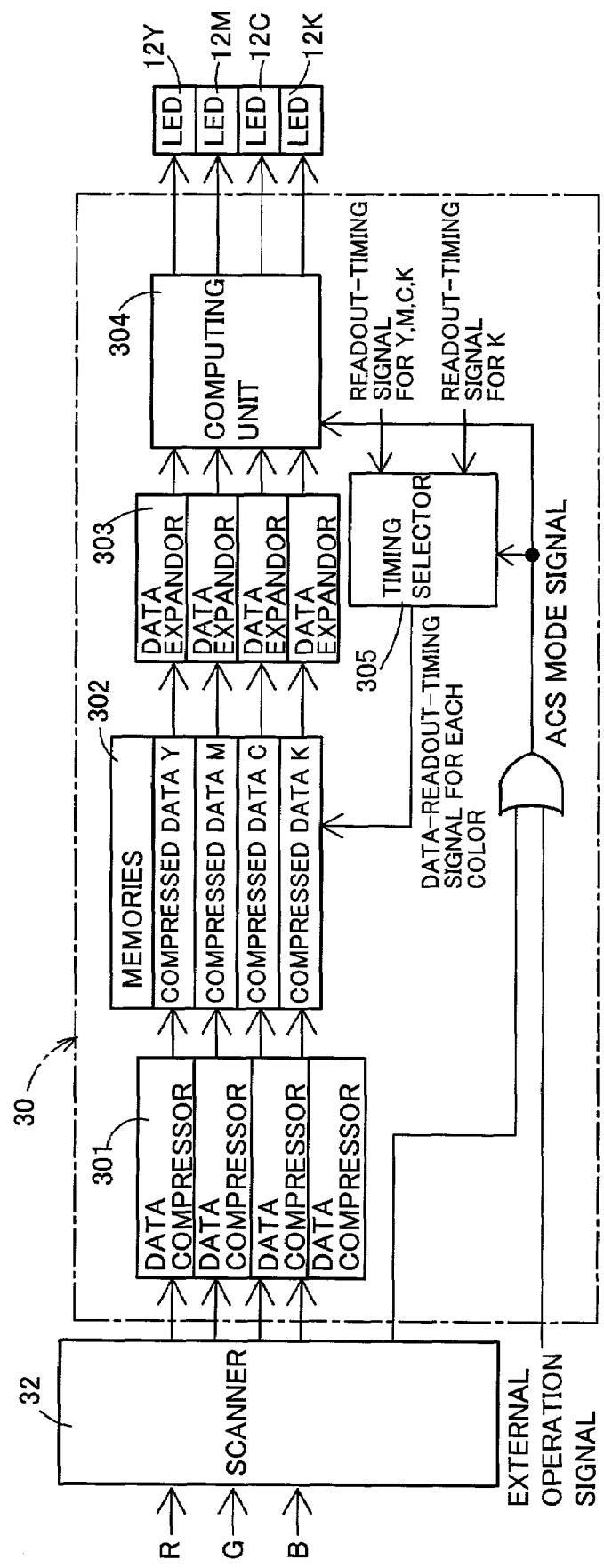
FIG. 4 is a block diagram showing a structure of an image control section.

Next, here will be described a control manner of the image control section 30. FIG. 4 is a block chart showing the structure of the image control section 30. The image control section 30 includes data compressors 301, memories 302, data expanders 303, a computing unit 304, and timing selector 305.

In the image control section 30, a plurality of image data corresponding to Y, M, C, and K, inputted from the scanner 32, are compressed at the data compressors 301 provided for respective colors. The compressed image data are sent to the memories 302 provided for respective colors and recorded therein.

A discrimination as to whether an image is to be printed in monochrome or multi-color (referred to as ACS mode signal hereinafter) is made based on information inputted from the scanner 32 or an operation by a user. An ACS mode signal as multi-color/monochrome discrimination is held in the timing selector 305. Furthermore, data-readout-timing signals corresponding to image data of respective colors, namely, YMCK, and monochrome K, are generated when it is time to print. Readout timing signals of respective colors are sent to the timing selector 305.

The timing selector 305 transmits readout timing signals responsive to an ACS mode signal to the memories 302. In case a readout-timing signal is for YMCK, which means multi-color print is to be executed, a plurality of image data of respective colors are transmitted to corresponding data expanders 303 from the memories 302 with different timing. Timing to transmit respective color data corresponds to timing to print images of respective colors on an image forming unit. On the other hand, in case a readout-timing signal is for monochrome K, which means monochrome print is to be executed, a plurality of image data of respective colors are transmitted to corresponding data expanders 303 from the memories 302 simultaneously. Timing to transmit the all color data coincides with timing to print an image of monochrome K. The image data of respective colors transmitted to the corresponding data expanders 303 are expanded there and the expanded data are transmitted to the computing unit 304. The computing unit 304 applies gradation reproduce processing (screen processing, edge enhancement processing, gamma correction processing and the like) to the data transmitted from the memories 302 and outputs the image data to respective LEDs.

Figure 5:
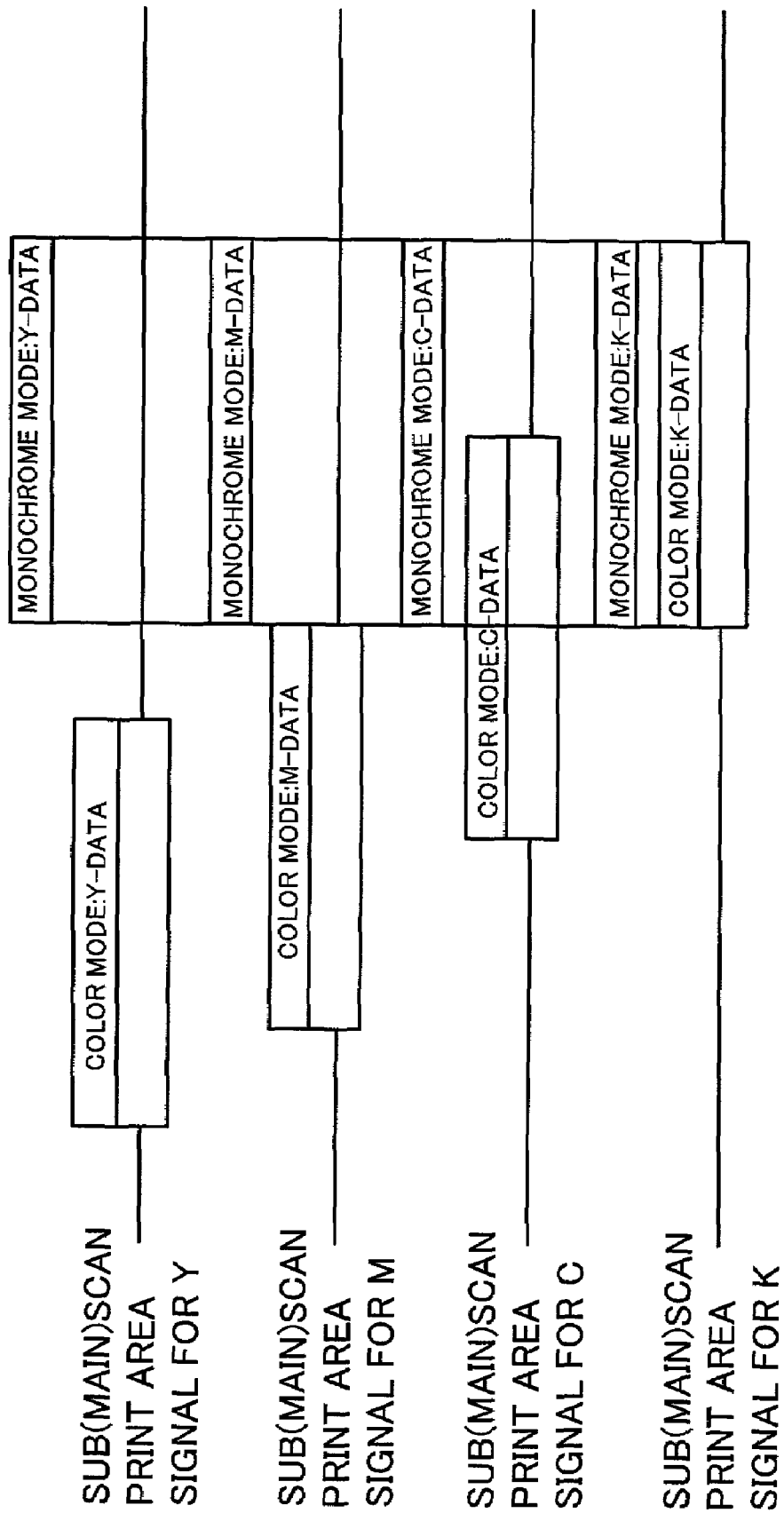
FIG. 5 is a diagram showing timing to read out data from respective color image data memories.

FIG. 5 is a diagram showing timing to read out data from memories of respective colors. In case of multi-color print, readout timing signals for Y, M, C, and K are generated with their respective print timing. Therefore, readout timing at the respective memories differs among respective colors. Time differences of data-readout among colors are provided so as to adjust degree of processing delay among image forming units of respective colors. On the other hand, in case of monochrome print, readout-timing signals for Y, M, C, and K are generated along with print timing for K. Accordingly, data of all the colors are read out from the respective memories 302 simultaneously.

Figure 6:
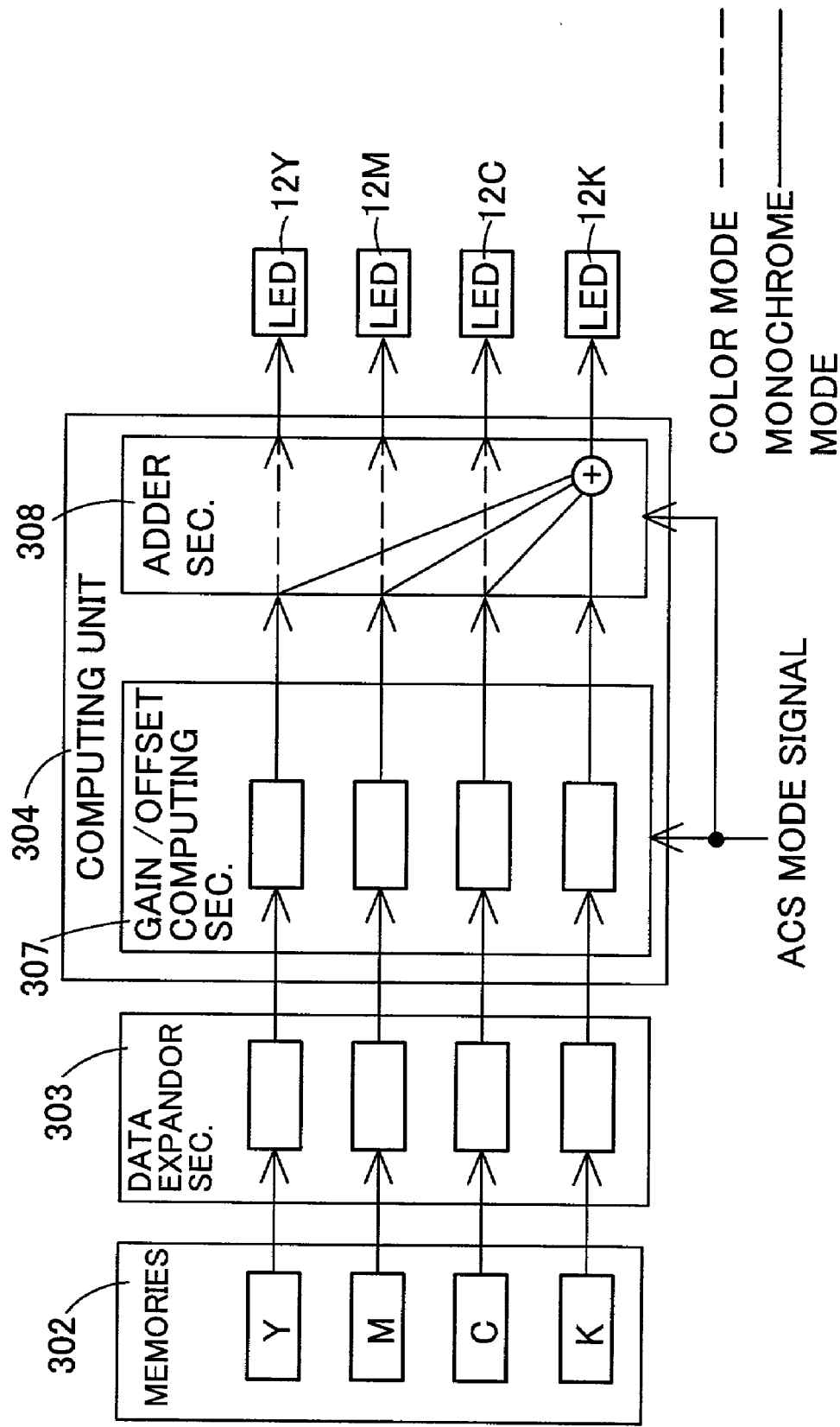
FIG. 6 is a block chart showing structure of a computing section.

Next, image data control in the computing unit 304 will be described. FIG. 6 is a block diagram showing the structure of the computing unit 304. There are arranged gain/offset computing sections 307 and an adder section 308 in the computing unit 304. Depending on type of mode, i.e., monochrome print mode or multi-color print mode, different manners of image data processing are executed in accordance with an ACS mode signal in the computing unit 304.

In case of monochrome print, image data of respective colors, namely, Y, M, C and K, are transmitted to the gain/offset computing sections 307 from the memories 302 simultaneously in accordance with a readout-timing signal for K. Image data of respective colors are converted into monochrome image data in accordance with a computing equation as below.

$$y = \text{gain} \times (x - \text{off})$$

"y" is resultant image data obtained by monochrome conversion. "x" is image data transmitted from one of the memories 302. "off" is an offset value set for respective colors. "gain" is a gain value set for respective colors. Add processing is applied to the converted image data for Y, M, C, and K by the adder section 308, whereby monochrome-converted image data of respective colors are obtained and outputted to print processing side.

On the other hand, in case of multi-color print, image data of respective colors are transmitted to the gain/offset computing sections 307 from the memories 302 with respective timing in accordance with readout-timing signals of respective colors. Image data of respective colors just go through both the gain/offset computing sections 307 and the adder section 308 without having any data processing thereat and the image data of respective colors in status quo are outputted to print processing side.

Next, details of computing process at the gain/offset computing section 307 will be described. The below are computing equations with respect to monochrome conversion of respective colors.

$$Yy=Ygain\times(Yx-Yoff)$$

$$My=Mgain\times(Mx-Moff)$$

$$Cy=Cgain\times(Cx-Coff)$$

$$Ky=Kgain\times(Kx-Koff)$$

Next, converted image data of respective colors are added together at the adder section 308 in accordance with a computing equation as below.

$$Kz=Yy+My+Cy+Ky$$

"Kz" is monochrome data to be outputted to print processing side. In case monochrome conversion is executed in accordance with this computing equation, output results differ, which depends on whether region discrimination is conducted or not.

Figure 7:
FIG. 7 shows an example of output result with respect to original document.
Figure 8:
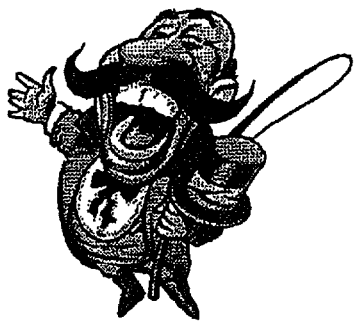
FIG. 8 shows an output result obtained in case region discrimination is not conducted.
Figure 9:
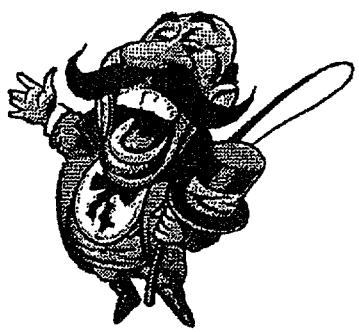
FIG. 9 shows an output result obtained in case region discrimination is conducted.

By referring to FIG. 8 and FIG. 9, here will be described differences of monochrome print results, one of which is obtained when region discrimination is conducted and the other is obtained without region discrimination. FIG. 7 shows images of an original document. FIG. 8 shows images of FIG. 7 reproduced without region discrimination, wherein character regions and photographic regions in the target images are converted into monochrome data using equivalent computing equations. Without region discrimination, character regions are reproduced lightly compared with photographic regions. On the other hand, FIG. 9 shows images of FIG. 7 reproduced with region discrimination, wherein character regions are reproduced clearly. In this case, image data conversion is conducted on condition that a gain value of color K in regions detected as character regions is set higher than a predetermined gain value for K and a gain value of color K in region detected as photographic regions is set to a predetermined gain value. In case character images are hard to distinguish from background color, offset values are set higher than predetermined offset values so as to make background color light. Thereby, characters can be reproduced clearly even in monochrome mode.

Figure 10:
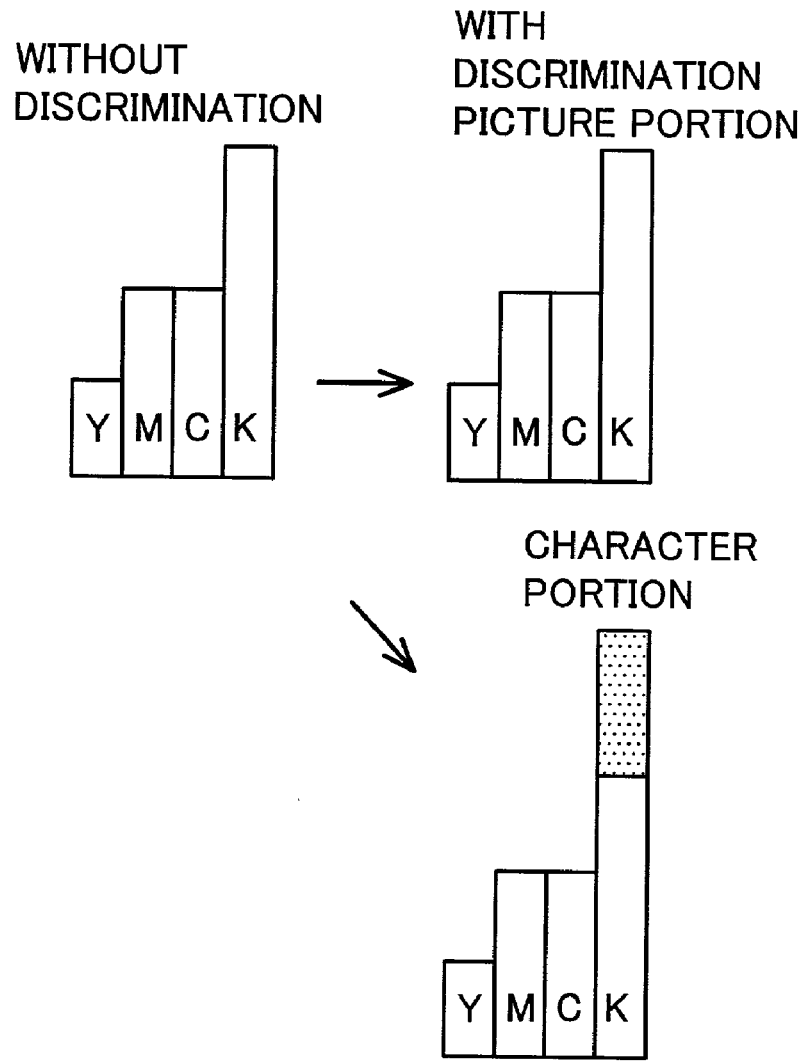
FIG. 10 shows graphs of gain values obtained in case region discrimination is conducted.

FIG. 10 shows graphs with respect to gain values of respective colors obtained when region discrimination is conducted. In case a target region is discriminated as a photographic region (upper right in FIG. 10), gain values of respective colors are set equivalent to gain values obtained without discrimination (left in FIG. 10). In case a target region is discriminated as a character region (lower right in FIG. 10), a gain value of color K is set higher than a gain value of color K obtained without discrimination. Thereby, blackness of character region is enhanced and character images in monochrome mode are outputted clearly.

Figure 11:
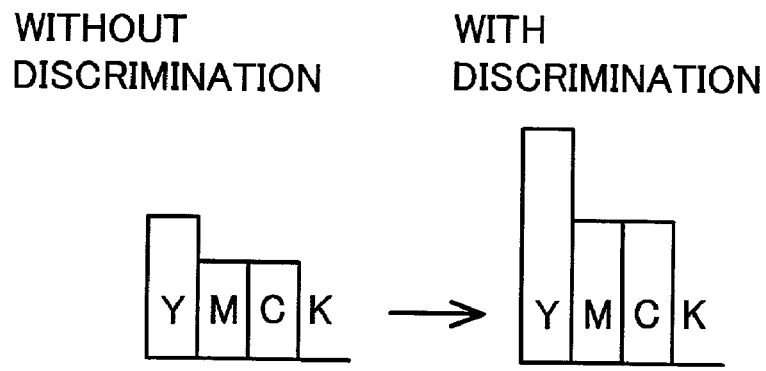
FIG. 11 shows graphs of offset values obtained in case region discrimination is conducted.

FIG. 11 shows a graph with respect to offset values of respective colors obtained when region discrimination is conducted. In case a region discrimination is conducted (right in FIG. 11), offset values of Y, M, and C colors are set higher compared with a case of without region discrimination in total. Thereby, light colors on background of an image are removed and character images are outputted clearly on the whole.

Figure 12:
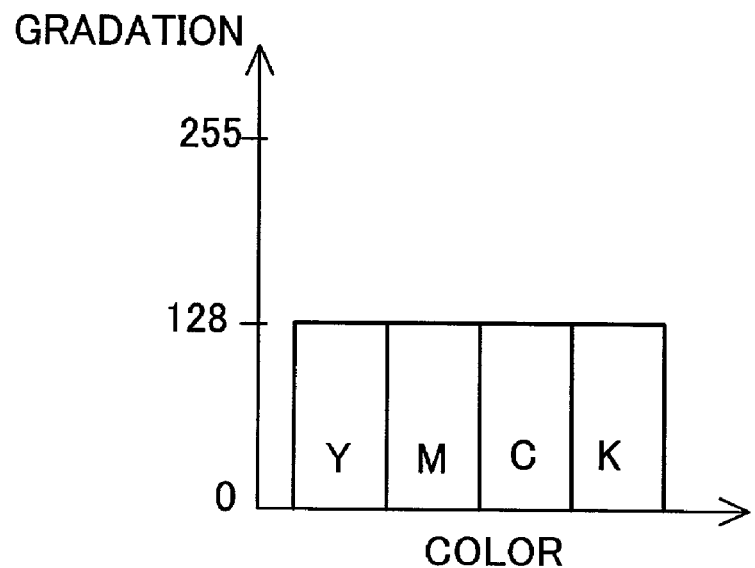
FIG. 12 shows a graph of gradation data obtained with respect to a full-color document.
Figure 13:
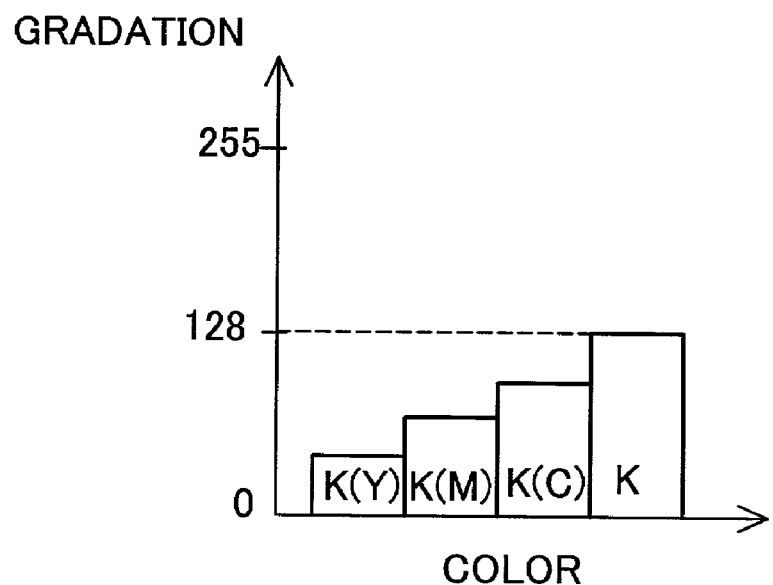
FIG. 13 shows a graph of gradation data with respect to a monochrome document.

FIG. 12 is a graph showing gradation data of respective colors for a multi-color image. FIG. 13 is a graph showing gradation data of respective colors obtained when the gradation data of FIG. 12 are converted into monochrome image data. K(Y) in FIG. 13 is equivalent to data of monochromatic color Y obtained by converting the data of color Y in FIG. 12 into color K data. K(M) is equivalent to data of monochromatic color M obtained by converting the data of color M into K data. K(C) is equivalent to the data of monochromatic color C obtained by converting data of color C into K data. Monochrome gradation data values corresponding to respective colors are set different from one another, whereby color differences in an original image can be expressed with color K only. To realize this color-monochrome data conversion, offset values and gain values of respective colors must be set appropriately as shown in FIG. 14. That is, as an offset value of a color is set larger, an output data value of the color becomes smaller proportionally, vice versa, as an offset value of the color is set smaller, an output data of it value becomes larger proportionally. Accordingly, offset values of respective colors must be set larger in order of Y, M, C, K. Furthermore, as a gain value is set smaller, output data value becomes larger. Accordingly, gain values of respective colors must be set larger in order of K, C, M, Y.

Figure 15:
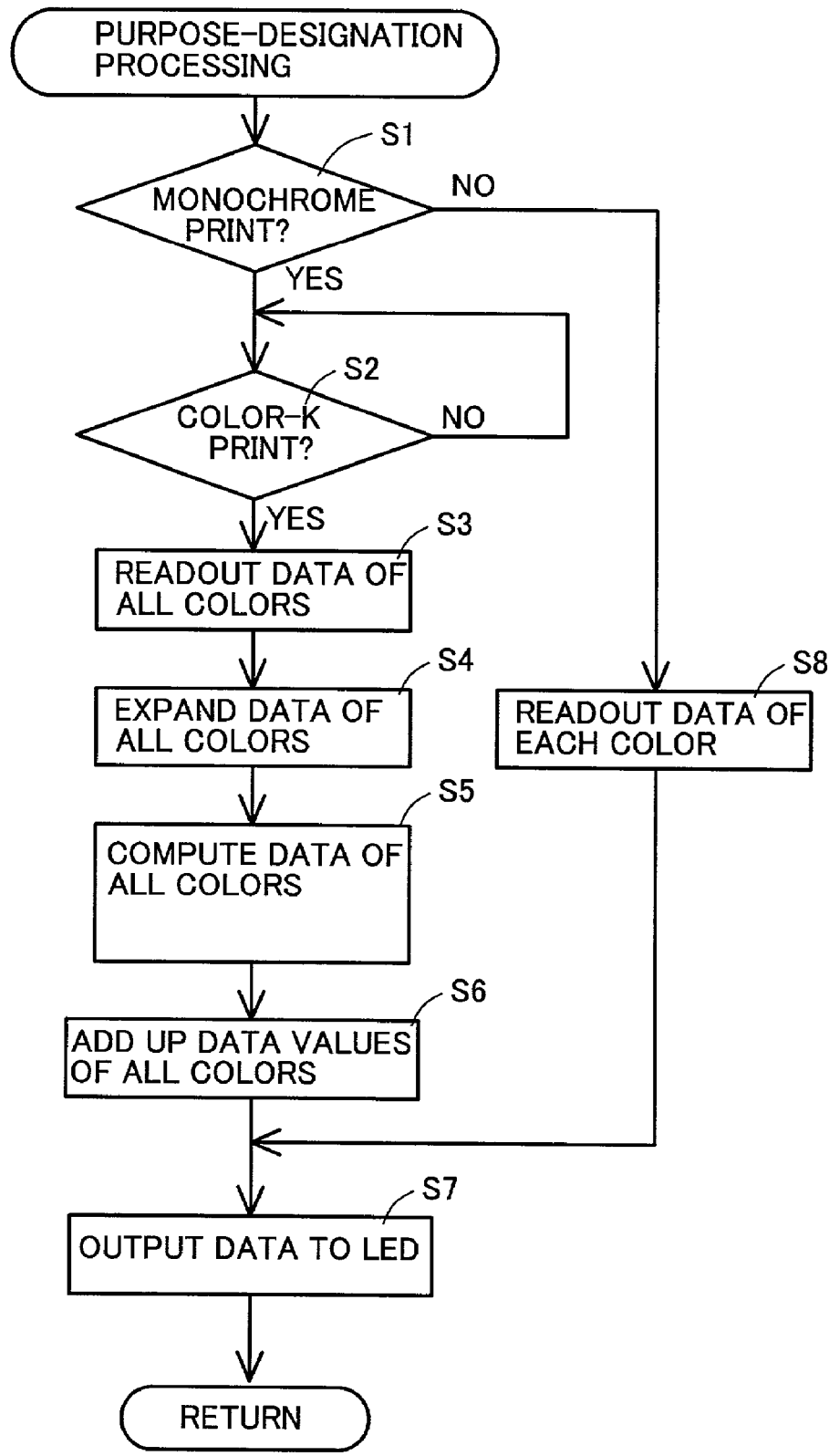
FIG. 15 is a flow chart of image processing directed to the present embodiment.

Descriptions of image processing so far are given on condition that a plurality of hardware are provided to execute respective functions, as shown in FIG. 4. However, execution of all the functions of image processing can be covered with software using a singularity of hardware. FIG. 15 shows a flow chart to be processed with software. The following paragraphs will account for the flow chart.

Firstly, type of print, namely, monochrome print or not, is discriminated (S1). The discrimination processing in S1 corresponds to processing executed by the timing selector 305 of FIG. 4. In case a discrimination result is monochrome print (S1:YES), data-readout processing is suspended until a readout-timing signal with respect to color-K is generated (S2). In case a readout timing signal with respect to color-K is generated (S2:YES), image data of all colors are read out simultaneously (S3). Next, image data of respective colors, readout in S3, are expanded (S4). The expansion processing in S4 corresponds to processing executed by the data expanders 303 in FIG. 4. Next, image data of respective colors, expanded in S4, are brought into computing processing to convert the expanded image data of respective colors into monochrome image data (S5). The computing processing in S5 corresponds to processing executed by the gain/offset computing section 307 in FIG. 6. In data computation, gain values and offset values are set to appropriate ones depending on types of images such as character image, photographic image or the like. Next, resultant image data obtained in S5 are added up (S6), thereby to form monochrome image data. The adding processing in S6 correspond to processing executed by the adder 308 in FIG. 6. Monochrome image data of respective colors formed in S6 are outputted to respective LEDs (S7), then the entire of image processing terminates.

Furthermore, in case it is discriminated as non-monochrome print (multi-color print) in S1 (S1:NO), readout-timing signals of colors Y, M, C, and K are generated one by one and image data of each color is read out in response to a readout timing signal of a corresponding color (S8). After readout processing in S8, image data of respective colors are outputted to LEDs corresponding to respective colors without computing processing, and adding processing (S7), then entire of image processing terminates.

As described, in the present embodiment, image data of colors YMCK, inputted from the scanner 32, are stored in the memories 302 with respect to each color. Furthermore, a multi-color/monochrome print determination is made based on contents of image data with respect to colors YMCK or selection by a user. In case multi-color print is to be executed, image data of respective colors are read out with respective predetermined timing difference, whereby image data of respective colors, as read out, are outputted. On the other hand, in case monochrome print is to be executed, image data of all colors are read out simultaneously with timing to read out image data of color K. A plurality of monochrome image data are formed based on respective color image data and resultant monochrome image data are outputted. Thereby, there are provided an image forming apparatus and a program product thereof that realize the following merits: (1) volume of memories used for processing is reduced; (2) there is cut out necessity to adjust operation timing of image processing units of respective colors in case monochrome image print is to be executed; and (3) productivity is enhanced.

Furthermore, region discrimination is conducted when monochrome image data are to be formed. In case discrimination results in a character region, operational parameters different from those for a photographic region are used. Accordingly, character region are clearly reproduced. Still further, operational parameters which differ by respective colors are used. Therefore, there can be reproduced a monochrome image lightness of which approximates that of original color image.

The above described embodiment is provided for mere illustrative purpose, and the present invention is not limited thereto. Of course, various modifications or variations can occur without departing from the spirit of the invention. For example, application of the inventive image processing is not limited to printers. The invention is applicable to any types of image processing apparatuses such as facsimile, copier and the like, which are capable of outputting images. Furthermore, an image forming unit is not limited to toner type but other type such as ink-jet type may be applicable.

What is claimed is:

1. An image processing apparatus for handling image data, the image processing apparatus comprising:
    a plurality of memories for storing image data of respective colors;
    color determining means for determining whether image data stored in the memories should be outputted in a multi-color mode or a monochrome mode;
    readout signal generating means for generating a plurality of readout signals of respective colors taking a predetermined length of time difference which differs among the respective colors in case a multi-color image is to be outputted, and generating a plurality of readout signals of respective colors simultaneously in case a monochrome image is to be outputted;
    readout means for reading out image data of respective colors from the memories in accordance with readout signals from the readout signal generating means; and
    monochrome-image-data forming means for forming monochrome image data in accordance with image data of respective colors read out by the readout means in case a monochrome image is to be outputted.

2. An image data processing apparatus according to claim 1, wherein the monochrome-image-data forming means selectively uses different operational parameters, and selection of the operational parameters depends on whether a target region in the image data is a character region or a photographic region.

3. An image data processing apparatus according to claim 2, wherein the monochrome-image-data forming means selectively puts different gain values as a multiplier factor on image data of respective colors and selection of the gain values depends on whether a target region in image data is a character region or a photographic region.

4. An image data processing apparatus according to claim 1, wherein the monochrome-image-data forming means uses operational parameters which differ by respective colors included in the target image data.

5. An image data processing apparatus according to claim 4, wherein the monochrome-image-data forming means puts gain values as a multiplier factor on image data of respective colors, and the gain values differ by respective colors included in the target image data.

6. An image data processing apparatus according to claim 4, wherein the monochrome-image-data forming means subtracts offset values from image data of respective colors, and the offset values differ by image data of respective colors included in the target image data.

7. An image forming apparatus for forming an image based on image data, the image data forming apparatus comprising:
    a plurality of image forming sections for forming images in different colors on image carriers arranged for each of the image forming sections;
    a plurality of memories for storing image data of respective colors, the memories being arranged for each of the image forming sections;
    color determining means for determining that an image formation based on image data stored in the memories should be executed in a multi-color mode or a monochrome mode;
    readout signal generating means for generating a plurality of readout signals for the respective memories with different timing in case a multi-color image is to be formed, and generating a plurality of readout signals for the respective memories simultaneously in case a monochrome image is to be formed;
    readout means for reading out image data of respective colors from the memories in accordance with readout signals from the readout signal generating means;
    first control means for controlling operation of the plurality of the image forming sections in accordance with image data read out by the readout means and for forming a color image;
    monochrome-image-data forming means for forming monochrome image data in accordance with image data of respective colors read out by the readout means; and
    second control means for controlling operation of one of the plurality of the image forming sections in accordance with monochrome image data formed by the monochrome-image-data forming means and for forming a monochrome image.

8. An image forming apparatus according to claim 7, wherein the monochrome-image-data forming means selectively uses different operational parameters, and selection of operational parameters depends on whether a target region in image data is a character region or a photographic region.

9. An image forming apparatus according to claim 8, wherein the monochrome-image-data forming means selectively puts different gain values as a multiplier factor on image data of respective colors, and selection of the gain values depends on whether a target region in the image data is a character region or photographic region.

10. An image forming apparatus according to claim 7, wherein the monochrome-image-data forming means selectively uses different operational parameters which differ by respective colors included in target image data.

11. An image forming apparatus according to claim 10, wherein the monochrome-image-data forming means puts different gain values as a multiplier factor on image data of respective colors, where the gain values differ by respective colors included in the target image data.

12. An image forming apparatus according to claim 10, wherein the monochrome-image-data forming means subtracts offset values from image data of respective colors, and the offset values differ by image data of respective colors included in target image data.

13. An image processing method for handling image data, the image processing method comprising:
   determining that an image based on image data is to be outputted as multi-color or monochrome;
   reading out a plurality of image data of respective colors with timing which differs by respective colors in case a multi-color image is to be outputted, and reading out a plurality of image data of respective colors simultaneously in case a monochrome image is to be outputted; and
   forming monochrome image data in accordance with image data of respective colors read out in case a monochrome image is to be outputted.

14. An image forming method for forming image based on image data, the image forming method comprising:
   determining that an image based on image data is to be formed as multi-color or monochrome;
   reading out a plurality of image data of respective colors with timing of which differs by respective colors in case a multi-color image is to be formed, and reading out a plurality of image data of respective colors simultaneously in case a monochrome image is to be formed;
   forming monochrome image data in accordance with image data read out in case a monochrome image is to be formed; and
   forming a multi-color image by controlling a plurality of image forming sections to operate in accordance with the plurality of the image data of respective colors read out in case a multi-color image is to be formed, and forming a monochrome image by controlling one of the plurality of the image forming sections to operate in accordance with the plurality of the image data of respective colors read out in case a monochrome image is to be formed.

15. A computer readable medium for storing a computer program for executing image data processing by an image processing apparatus, the computer program comprising:
   determining that an image based on image data is to be outputted in multi-color or monochrome;
   reading out a plurality of image data of respective colors with timing which differs by colors in case a multi-color image is to be formed, and reading out a plurality of image data of respective colors simultaneously in case a monochrome image is to be formed; and
   forming monochrome image data in accordance with image data of the respective color read out in case a monochrome image is to be outputted.

* * * * *